Patented June 5, 1923.

1,457,935

UNITED STATES PATENT OFFICE.

JAMES B. PIERCE, JR., OF CHARLESTON, WEST VIRGINIA.

METHOD OF MAKING PRECIPITATED BARIUM SULPHATE.

No Drawing.   Application filed October 8, 1921. Serial No. 506,337.

*To all whom it may concern:*

Be it known that I, JAMES B. PIERCE, Jr., a citizen of the United States, and a resident of Charleston, in the county of Kanawha and State of West Virginia, have invented new and useful Improvements in Methods of Making Precipitated Barium Sulphate, of which the following is a specification.

This invention relates to the production of barium sulphate, or blanc fixe, and has for its principal objects the economical production of blanc fixe of an extreme degree of fineness and possessing a freedom from foreign substances, especially alkaline, acid and neutral salts and iron, which imparts to the resulting product the more desirable qualities irrespective of whether the ultimate particles are amorphous or crystalline.

It is well known that precipitated barium sulphate can be prepared by double decomposition between solutions of barium sulphide and sodium sulphate, the sodium sulphide solution so obtained being usually decanted, and then the residual precipitate of barium sulphate can be washed by decantation, dried and disintegrated. However, the character of the resulting product, particularly in the respects above noted, will vary considerably according to the conditions maintained throughout the precipitation and washing periods as hereinafter explained.

My investigations have led to the discovery that in the production of precipitated barium sulphate, or blanc fixe, by the interaction of barium sulphide and sodium sulphate, a finer and more readily lixiviated precipitate of barium sulphate is obtained if a substantial excess of barium sulphide is maintained in the solution throughout the precipitation. Moreover, that the temperature and strength of the reacting solutions employed have a very important influence upon the degree of fineness and other physical characteristics of the precipitate. Furthermore, even the temperature and purity of the wash water has an important influence upon the fineness, color and purity of the precipitated barium sulphate produced.

In carrying out my invention I preferably proceed as follows:

A solution of barium sulphide is caused to interact with a solution of sodium sulphate, the barium sulphide being maintained in excess, throughout the precipitation, of that theoretically required to satisfy the sodium sulphate. The temperatures of the solution or barium sulphide and sodium sulphate are maintained at such points that the temperature of the mixture in the precipitating vessel will range between 50° C. and 100° C., preferably from 60° C. to 75° C., throughout the precipitation. Between these temperatures the precipitated barium sulphate is finer than if the solution were colder and furthermore the precipitated barium sulphate, due to the fineness and physical characteristics thereof, tends to settle much faster in the precipitating vessel, with a consequence that the top liquor and subsequent wash solution can be decanted off in a more satisfactory manner. It is important, moreover, that the strength of the aforesaid barium sulphide solution should be between the ranges of 12% and 20% of barium sulphide content and also that the strength of the aforesaid sodium sulphate solution should be between the ranges of 20% to 30% sodium sulphate content.

Variations from the aforesaid limits, either of the strength or the temperatures of the solutions employed, will result in the production of a coarse precipitate of barium sulphate which settles much slower and is accordingly less easily washed or decanted.

The precipitate obtained from the foregoing reaction is washed with water free from iron or added foreign salts, preferably water which has been agitated with a small amount of barium carbonate sufficient to remove any iron and like impurities therein and then filtered, as if ordinary surface or well water is used the precipitated barium sulphate will be distinctly colored, due to the formation of iron sulphide by interaction between the salts in the water and sodium sulphides of the top liquor. In order to maintain at the maximum the advantages resulting from the foregoing treatment, it is also highly desirable that the wash water should be maintained at a temperature of not less than 50° C., preferably from 60° C. to 75° C., during the washing operation.

A careful observance of the foregoing conditions during the precipitation and washing of the barium sulphate will enable one to produce a practically neutral (only the very slightest trace of alkalinity) precipitated barium sulphate, or blanc fixe of pure white color whose ultimate particles under the microscope appear spherical in shape and amorphous rather than cystalline in physical character and measure from two to three micromillimeters in diameter.

Without departing from the spirit of my invention, various modifications, within the scope of the appended claims, may be made in the within procedure.

Having thus described my invention, what I claim and desire to secure by Letters Patent is:

1. The method of making precipitated barium sulphate which consists in effecting double decomposition between a barium sulphide solution containing from 12% to 20% of barium sulphide and a sodium sulphate solution containing from 20% to 30% of sodium sulphate, while maintaining the temperature of the mixture during the precipitation between 50° C. and 100° C. separating the resultant precipitate and washing the same with relatively hot water of a temperature of at least 60° C. and free from iron and deleterious salts.

2. In the method of making precipitated barium sulphate, the step which consists in effecting a reaction between a solution of barium sulphide containing from 12% to 20% of barium sulphide and a solution of sodium sulphate containing from 20% to 30% of sodium sulphate.

3. In the method of making precipitated barium sulphate, the steps which consist in effecting double decomposition between solutions of barium sulphide and sodium sulphate while maintaining the temperature of the mixture during the decomposition reaction between 50° C. and 100° C.

4. The method of making precipitated barium sulphate which consists in effecting double decomposition between a barium sulphide solution containing from 12% to 20% of barium sulphide and a sodium sulphate solution containing from 20% to 30% of sodium sulphate, while maintaining the temperature of the mixture during the precipitation between 60° C. and 75° C. separating the resultant precipitate and washing the same with relatively hot water of a temperature of at least 60° C. and free from iron and deleterious salts.

5. In the method of making precipitated barium sulphate, the steps which consist in effecting double decomposition between solutions of barium sulphide and sodium sulphate, while maintaining the temperature of the mixture during the decomposition reaction between 60° C. and 75° C.

Signed at Charleston, in the county of Kanawha and State of West Virginia, this 23rd day of September, 1921.

JAMES B. PIERCE, Jr.